United States Patent [19]

Kato

[11] Patent Number: 5,649,338
[45] Date of Patent: Jul. 22, 1997

[54] AUTOMATIC INTERIOR CLEANING SYSTEM FOR A POWDERED MATERIAL PROCESSING DEVICE

[75] Inventor: Fumio Kato, Handa, Japan

[73] Assignee: Tsukasa Industry Co., Ltd., Aichi, Japan

[21] Appl. No.: 510,917

[22] Filed: Aug. 3, 1995

[30] Foreign Application Priority Data

Mar. 23, 1995 [JP] Japan .................................. 7-91471
Mar. 23, 1995 [JP] Japan .................................. 7-91472

[51] Int. Cl.$^6$ .................................................. B08B 5/02
[52] U.S. Cl. .................. 15/304; 15/312.1; 15/316.1; 15/404
[58] Field of Search ................ 15/304, 301, 312.1, 15/316.1, 404; 366/101, 138

[56] References Cited

U.S. PATENT DOCUMENTS

| | | | |
|---|---|---|---|
| 2,325,023 | 7/1943 | Allred | 15/316.1 |
| 2,602,003 | 7/1952 | Wellborn | 15/316.1 X |
| 4,261,075 | 4/1981 | Gruen | 15/316.1 |
| 4,282,090 | 8/1981 | Hoernschmeyer et al. | |
| 4,934,569 | 6/1990 | Womack et al. | |
| 5,081,737 | 1/1992 | Dues | 15/316.1 |
| 5,507,841 | 4/1996 | Heckman et al. | 15/301 |

FOREIGN PATENT DOCUMENTS

| | | |
|---|---|---|
| 0053759 | 11/1981 | European Pat. Off. . |
| 0589502 | 8/1993 | European Pat. Off. . |
| 898503 | 5/1943 | France . |
| 1257057 | 2/1960 | France . |
| 2245302 | 3/1974 | Germany . |
| 2529063 | 2/1977 | Germany . |
| 1562592 | 3/1980 | United Kingdom . |
| 2223747 | 4/1990 | United Kingdom . |
| 9415728 | 7/1994 | WIPO . |

*Primary Examiner*—Chris K. Moore
*Attorney, Agent, or Firm*—Morrison Law Firm

[57] ABSTRACT

An automatic interior cleaning system for a powdered material processing device cleans interior surfaces of powdered material processing devices such as silos, mixers, and dust collectors. A compressor and an accumulator tank supply a cleaning gas, preferably air, at a sufficient pressure to dislodge residues of powdered materials that collect on interior surfaces of a powdered material processing device. A valve connecting the accumulator tank to a cleaning nozzle tube opens and closes, supplying a pulse of air to the cleaning nozzle tube. Slits in the cleaning nozzle tube deliver the pulse of pressurized air to an inside surface of the powdered material processing device. The pulse of pressurized air produces a shock wave which dislodges residues from the interior surface of the powdered material processing device. Automatic removal of residues during processing prevents contamination of subsequently processed materials.

10 Claims, 8 Drawing Sheets

AUTOMATIC INTERIOR CLEANING SYSTEM FOR A POWDERED MATERIAL PROCESSING DEVICE

BACKGROUND OF THE INVENTION

The present invention relates to an automatic interior cleaning system for powdered material processing and storing devices, such as silos, mixers, and dust collectors. In particular, the present invention relates to an automatic interior cleaning system which removes residues from interior surfaces of powdered material devices which process powdered materials.

Examples of powdered materials used in food materials and industrial raw materials currently supplied to the market include granulated sugar, glucose, powdered skim milk, starch, rice bran, seasonings, cement, fly ash, carbon black, salt, detergent, wheat, rice, maize, soybean, malt, quartz sand, aluminum oxide, titanium oxide, calcium carbonate, dust coal, time, soda ash, powdered food mixes, flour, powdered soup, powdered petrochemicals, pharmaceuticals, pigments, mixed fertilizer, phenol resins, polyethylene resins, ABC resins, PVC powder, polypropylene powder, and powder coating. Manufacturing companies produce these powdered materials and pack them in bags or plastic containers to sell. Small and medium scale factories use powdered material straight from the bags or shipping containers. Thus small and medium scale operations do not need large-scale powdered material storage and processing devices.

In contrast, large scale factories use large quantities of powdered materials. The shipping and handling of large quantities of powdered material requires heavy machinery. Typically, air conveyors transport powdered materials from trucks into silos for storage. Pneumatic feeders transport powdered material as needed for processing. Mixers and dust collectors mix and separate powdered materials.

Transporting and processing powdered material stirs up the powdered material. Powdered material accumulates on the interior surfaces of processing devices, such as silos, mixers, and dust collectors. Powdered material is especially prone to adhere to corners. Residues accumulate each time a powdered material processing device is operated. Over time, accumulations of powdered foods spoil. Similarly, powdered chemicals decompose or change in composition. Furthermore, spoiled or chemically-altered powdered material adhering to a ceiling of a processing apparatus falls into and contaminates newly-processed material. Contamination reduces the quality of powdered material. In the worst case, contamination renders powdered material worthless.

A known solution for preventing contamination of powdered material in large-scale operations is to periodically stop production and manually clean the interior of a powder processing device. In general, a worker removes accumulations of powdered materials from interior ceilings, side walls, and processing machinery with an air gun or a high pressure water sprayer.

One problem with manual cleaning is danger to the worker. For example, in a silo, the worker cleans from high places, such as ladders or catwalks. Using a water sprayer on a ladder or a catwalk to clean a silo increases the chances that the worker will slip and fall. Similarly, in mixers and dust collectors, the worker enters the interior of the machinery. Stirring up dust during the cleaning process causes respiratory problems. Also, large accumulations on the ceiling of a processing device can fall and injure or even crush the worker.

Another problem with manual cleaning is contamination of the processing device by the worker. Food-processing devices are particularly susceptible to contamination. The worker introduces bacteria into the interior of the food processing device when the worker enters the device to clean it. Unsanitary conditions result.

A further problem with conventional cleaning methods is down time. Manual cleaning requires stopping the powdered material processing device. Cleaning takes time. Cleaning with water requires additional time for drying. All of the interior processing equipment must be completely dried before restarting the device to prevent coagulation of powdered material. The resulting down time from stopping until restarting increases processing costs of powdered material.

A further problem that occurs with using water to clean powdered material processing devices is waste disposal. Waste water contaminated with powdered material must be properly disposed of. Environmental regulations governing waste water disposal increase the cost and reduce the practicality of using water to clean powdered material processing devices.

OBJECTS AND SUMMARY OF THE INVENTION

Accordingly, an object of the present invention is to provide an automatic interior cleaning system for a powdered material processing device which overcomes the drawbacks of the prior art.

Another object of the present invention is to provide an automatic interior cleaning system for a powdered material processing device which reduces powdered material production costs.

A further object of the present invention is to provide an automatic interior cleaning system for a powdered material processing device which increases worker safety by eliminating manual interior cleaning.

A still further object of the present invention is to provide an automatic interior cleaning system for a powdered material processing device which effectively cleans the interior of processing and storage facilities in a minimal amount of time.

Briefly stated, an automatic interior cleaning system for a powdered material processing device cleans interior surfaces of powdered material processing devices such as silos, mixers, and dust collectors. A compressor and an accumulator tank supply a cleaning gas, preferably air, at a sufficient pressure to dislodge residues of powdered materials that collect on interior surfaces of a powdered material processing device. A valve connecting the accumulator tank to a cleaning nozzle tube opens and closes, sending a pulse of air to the cleaning nozzle tube. Slits in the cleaning nozzle tube deliver the pulse of pressurized air to an inside surface of the powdered material processing device. The pulse of pressurized air produces a shock wave which dislodges residues from the interior surface of the powdered material processing device. Automatic removal of residues during processing prevents contamination of subsequently processed materials.

According to an embodiment of the present invention, an automatic interior cleaning system for a powdered material processing device includes: a hollow pipe having closed ends, a plurality of slits through the pipe, and means for feeding pulses of a gas to an interior of the pipe, whereby the pulses clean an interior of the device.

According to another embodiment of the present invention, an automatic interior cleaning device for a silo includes: a hollow pipe having closed ends, the pipe having a U-shape, a plurality of slits through the pipe, a first group of the slits facing a ceiling member of the silo, a second group of the slits facing a side wall of the silo, means for rotating the pipe, and means for feeding pulses of a gas to an interior of the pipe; whereby the pulses clean an interior of the silo.

According to a further embodiment of the present invention, an automatic interior cleaning system for a powdered material processing device includes: a hollow pipe having closed ends, a plurality of slits formed through opposing surfaces of the pipe, a flexible member with opposing edges sealing the pipe in a corner of the device, the pipe bridging two interior walls of the device, means for feeding a gas to an interior of the hollow pipe, the gas exiting the pipe through the slits, whereby the gas produces a pressure in the corner, the pressure flexing the opposing edges of the flexible member inward, thereby expelling pulses of the gas from the corner, and the pulses moving outward from the corner, whereby the pulses clean the device.

According to a further embodiment of the present invention, an automatic interior cleaning system for a mixer includes: a plurality of hollow pipes, each of the piped having an open end and a closed end, the pipes located near a ceiling member of the mixer, a plurality slits formed through each of the pipes, the slits facing the ceiling member inside the mixer, means for oscillating the pipes, whereby the slits sweep through a predetermined angle across the ceiling member, and means for feeding pulses of a gas to an interior of the pipes, whereby the pulses clean the ceiling member.

According to a further embodiment of the present invention, an automatic interior cleaning device for a rotary separator includes: a hollow pipe having an open end and a closed end, the closed end extending into the rotary separator, the open end located outside of the separator, a plurality of slits formed through the pipe, the pipe attaching near a ceiling member of the rotary separator, the slits facing upward toward said ceiling member, the means for feeding pulses of a gas to an interior of said pipe, whereby the pulses clean the ceiling member.

According to a further embodiment of the present invention, an automatic interior cleaning system for a powdered material processing filter includes: a plurality of hollow pipes, each of the pipes having an open end and a closed end, means for attaching the pipes near a ceiling of the powdered material processing filter, a plurality of slits being formed through each of the pipes, the slits facing upward toward the ceiling member, means for oscillating the pipes such that the slits sweep through a predetermined angle across the ceiling member, and means for feeding pulses of a gas to an interior of each of the pipes, whereby the pulses clean the ceiling member.

According to a further embodiment of the present invention, an automatic interior cleaning system for a powdered material processing device includes: at least one hollow member having closed ends, means for feeding pulses of a gas to an interior of the member, and means for transmitting the pulses from the interior of the member to an interior of the device, whereby the pulses clean the interior of the device.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3(b) is a top plan view of the embodiment of FIG. 3a.

DETAILED DESCRIPTION OF THE PREFERRED EMBODIMENTS

Figure 1:
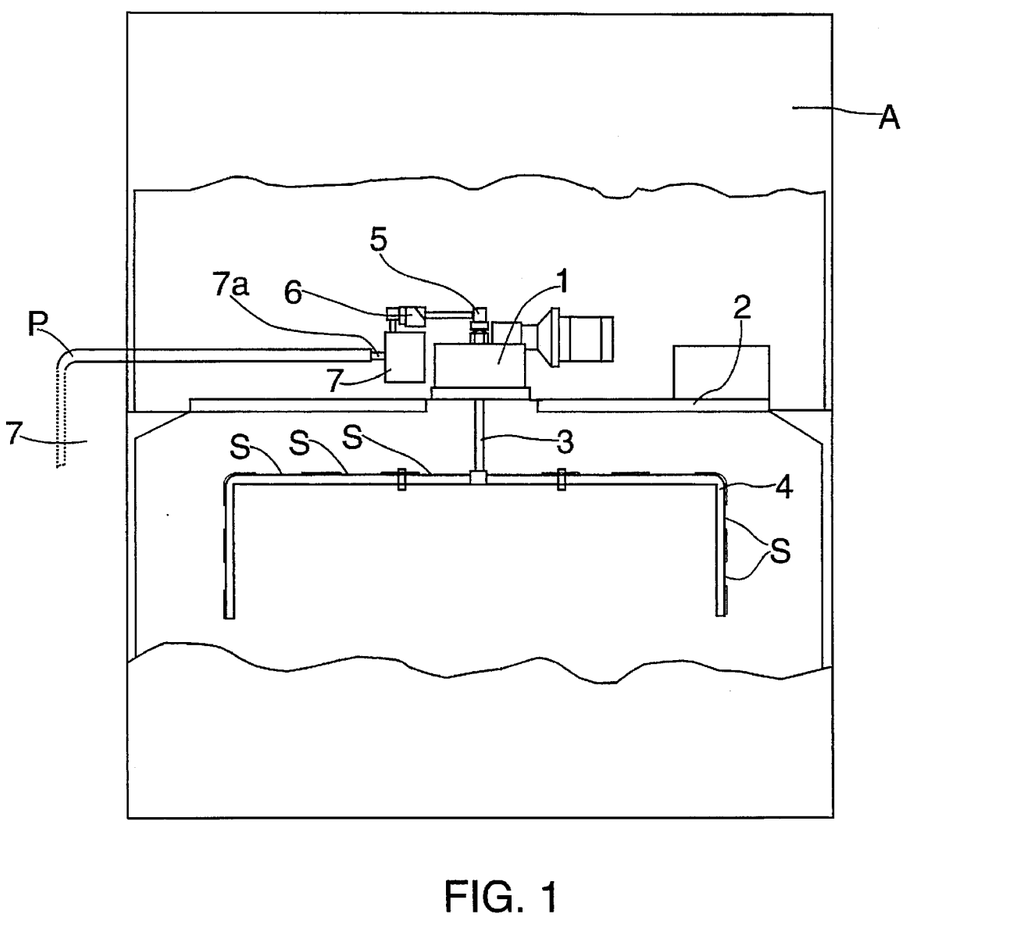
FIG. 1 is a side view of a silo cleaning device and a silo according to an embodiment of the present invention.

Referring to FIG. 1, an embodiment of the present invention automatically cleans powdered a material storage device, such as a silo. A drive assembly 1, with a speed reducer (not shown), attaches to a central area of an upper region of a silo body A. A ceiling member 2 separates drive assembly 1 from a region inside silo body A which stores powdered material. A hollow rotating shaft 3 originates from drive assembly 1, penetrates through ceiling member 2, and connects drive assembly 1 to a center portion of a cleaning nozzle pipe 4. Rotating shaft 3 is preferably constructed of a noncorrosive material with high tensile strength, such as copper or PVC (polyvinyl chloride). During cleaning, drive assembly 1 rotates rotating shaft 3, which rotates cleaning nozzle pipe 4.

Cleaning nozzle pipe 4 is a hollow, U-shaped, pipe with closed ends. Cleaning nozzle pipe 4 is constructed of a noncorrosive material with high tensile strength, such as copper or PVC. A plurality of equally spaced slits S is formed lengthwise on cleaning nozzle pipe 4. Slits S face outward (towards an inner wall and a ceiling of silo body A) to communicate a cleaning gas, preferably air, from a hollow interior of cleaning pipe 4 to inner surfaces of silo body A. Cleaning nozzle pipe 4 is of a length sufficient to position slits S near a side wall of silo body A.

A compressor (not shown) supplies air to an accumulator tank 7 through a pipe P. A high pressure inlet valve 7a controls the flow of air from the compressor to accumulator tank 7. Accumulator tank 7 stores air at a pressure sufficient to dislodge residues from the particular material being processed. For example, a greater pressure is required to dislodge flour residue than rice residue. An electromagnetic valve 6 controls air flow from accumulator tank 7 through a rotary joint 5 to rotating shaft 3.

Figure 2:
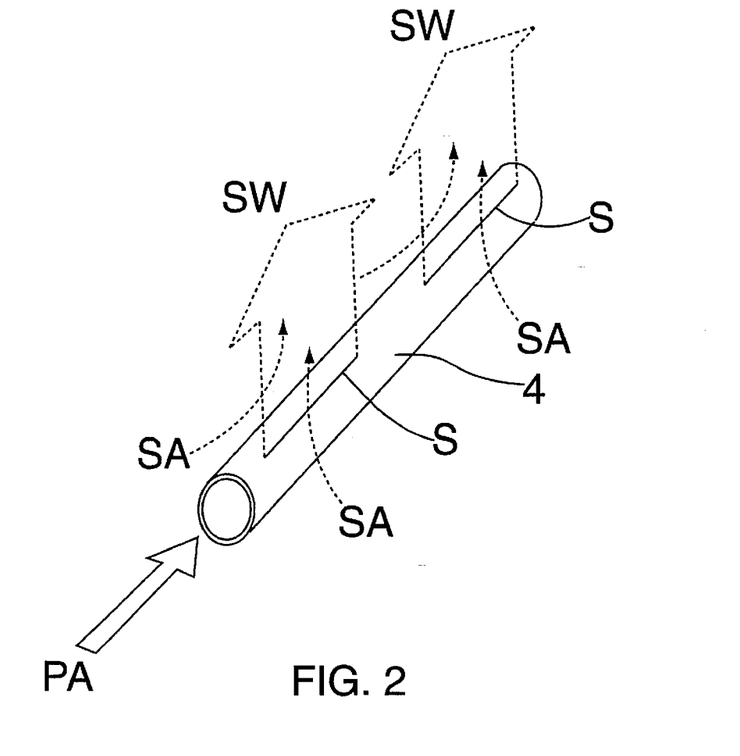
FIG. 2 is a perspective view of a cleaning nozzle pipe according to the embodiment of FIG. 1.

When powdered material accumulates on interior surfaces of silo body A, drive assembly 1 rotates cleaning nozzle pipe 4 at 9–10 rpn/m (speed varies with air pressure). Electromagnetic valve 6 opens and closes sequentially, supplying a high pressure air pulse PA from accumulator tank 7 to cleaning nozzle pipe 4. Referring to FIG. 2, high pressure air pulse PA is expelled from slits S of cleaning nozzle pipe 4.

High pressure air pulse PA joins secondary air SA inside silo body A to produce a shock wave SW of air. Shock wave SW of air cleans the ceiling member 2 and side walls by blowing off powdered residues. A powdered material stored in silo body A leaves no residue to contaminate subsequently stored materials after removal of the powdered material for processing.

Figure 3A:
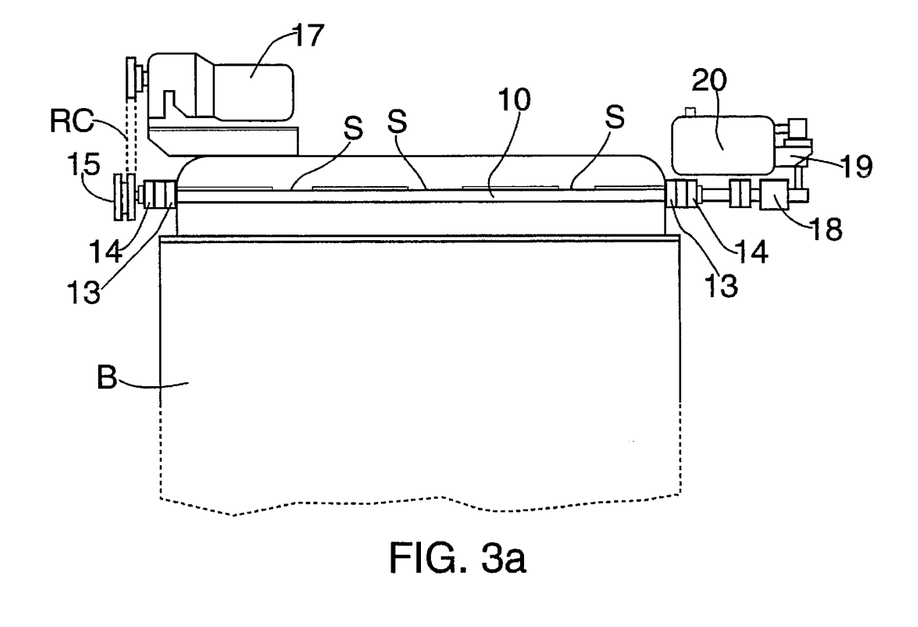
FIG. 3(a) is a side view of a mixer cleaning device and a mixer according to another embodiment of the present invention.
Figure 3B:
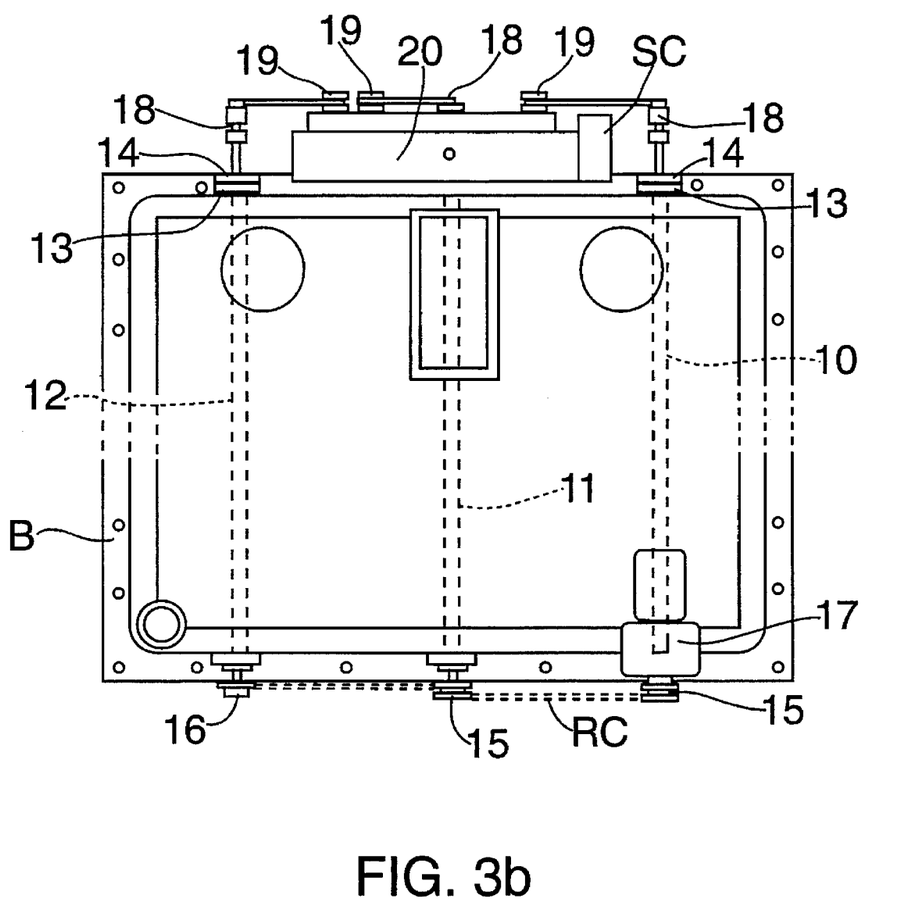

Referring to FIGS. 3(a) and 3(b), another embodiment of the present invention cleans interior surfaces of a powdered material processing device, such as a mixer. Three hollow cleaning nozzle pipes 10, 11, 12 attach to an interior ceiling member of a mixer B. Cleaning nozzle pipes 10, 11, 12 are preferably constructed of a noncorrosive material with high tensile strength such as copper or PVC. Cleaning nozzle pipes 10, 11, 12 include a plurality of equally spaced slits S formed lengthwise which release a cleaning gas, preferably air, to interior surfaces of mixer B.

Each cleaning nozzle pipe 10, 11, 12 has an open end and a closed end so that air entering the cleaning nozzle pipes 10, 11, 12 through the open end is force out through slits S. The closed end of each cleaning nozzle pipe 10, 11, 12 rotationally attaches to a geared motor 17 which oscillates during cleaning. Geared motor 17 directly oscillates cleaning nozzle pipe 10. A roller chain RC attaches a double sprocket 15 on a shaft of geared motor 17 to a double sprocket 15 on cleaning nozzle pipe 11. A drive belt can be used instead of a roller chain; however, a roller chain is more durable than a drive belt. Similarly, a roller chain RC attaches a single sprocket 16 on cleaning nozzle pipe 12 to double sprocket 15 on cleaning nozzle pipe 11. Geared motor 17 oscillates, causing slits S on all three cleaning nozzle pipes 10, 11, 12 to sweep through a predetermined angle across the ceiling member of the mixer. The predetermined angle of oscillation is set such that the ceiling member is fully cleaned without interfering with a mixing process in a lower region of mixer B.

The open end of each cleaning pipe 10, 11, and 12 connects to a rotary joint 18 and a diaphragm electromagnetic valve 19 by way of an oil seal 13 and a rhombic flanged unit 14. Each diaphragm electromagnetic valve 19 controls high pressure air flow from an accumulator tank 20 to each cleaning nozzle pipe 10, 11, 12. Air flows from accumulator tank 20 to each diaphragm electromagnetic valve 19, then through a nipple (not shown), an elbow (not shown), a hose nipple (not shown), a jubilee band (not shown), and a high pressure hose (not shown) to each cleaning nozzle pipe 10, 11, 12. A sequence controller SC sends an OPEN or CLOSE signal to each electromagnetic valve 19 according to an outside command signal. A compressor (not shown) supplies pressurized air to accumulator tank 20.

When powdered material residues accumulate on a ceiling member of mixer B, geared motor 17 oscillates, thereby causing cleaning nozzle pipes 10, 11, 12 to oscillate. The compressor starts and pressurizes accumulator tank 20 to a pressure sufficient to dislodge residue from a particular powdered material being processed. If accumulator tank 20 is full, the compressor does not start.

Once accumulator tank 20 is pressurized, a microcomputer (not shown) operates sequence controller SC according to a sequential program. Sequence controller SC opens and closes diaphragm electromagnetic valves 19. As a result, while cleaning nozzle pipes 10, 11, 12 oscillate, a high pressure air pulse is expelled from slits S. A resulting shock wave of air cleans the ceiling member of mixer B by blowing off powdered material residues. Thus when a mixed powdered material is extracted from mixer B, the mixed powdered material leaves no residue to contaminate a subsequent material.

Figure 4:
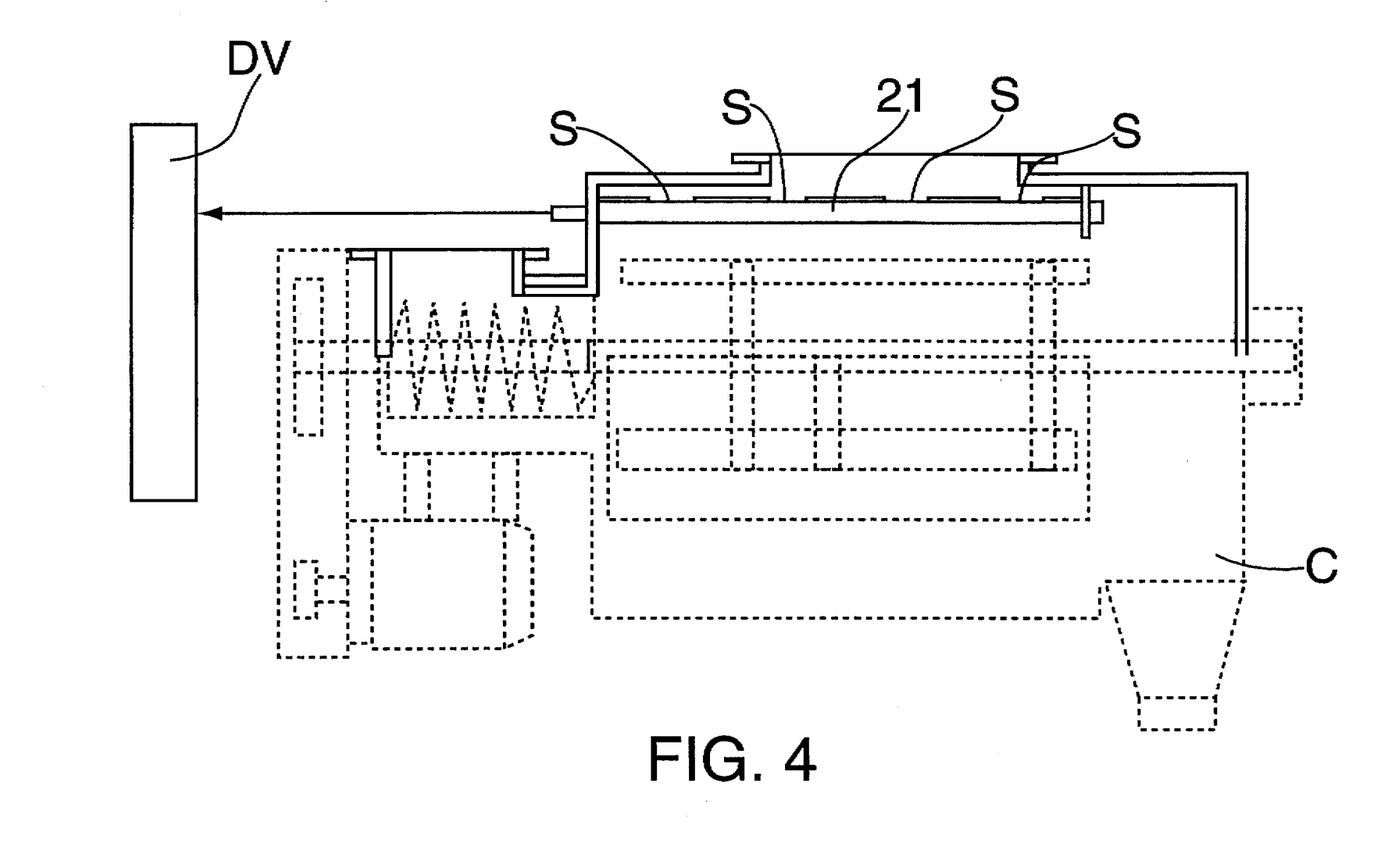
FIG. 4 is a side view of a rotary separator cleaning device and a rotary separator according to another embodiment of the present invention.

Referring to FIG. 4, another embodiment of the present invention automatically cleans interior surfaces of a powdered material processing device, such as a rotary separator. Solid lines indicate parts of a cleaning apparatus according to the present embodiment. Dotted lines indicate a processing room of a rotary separator C. A hollow cleaning nozzle pipe 21 extends parallel to a ceiling member at an apex inside of the powder processing room of rotary separator C. Cleaning nozzle pipe 21 is preferably constructed of a noncorrosive material with high tensile strength, such as copper or PVC. A plurality of equally spaced slits S for releasing air is formed on an upper section of cleaning nozzle pipe 21. A closed end of cleaning nozzle pipe 21 extends into the processing room of rotary separator C. An open end of cleaning nozzle pipe 21 connects to a diaphragm electromagnetic valve DV outside of the powder processing room of rotary separator C.

Diaphragm electromagnetic valve DV pulses to control air flow from a high pressure air accumulator tank (not shown) to cleaning nozzle pipe 21. A compressor (not shown) supplies air to the high pressure air accumulator tank.

When powdered material residue adheres to the ceiling member of rotary separator C, the compressor starts and pressurizes the high pressure accumulator tank to a sufficient pressure to dislodge residue from a particular powdered material being processed. If the accumulator tank is already full, the compressor does not start.

Once the accumulator tank is pressurized, diaphragm electromagnetic valve DV opens and closes. A high pressure air pulse is upwardly expelled from slits S of cleaning nozzle pipe 21. A resulting shock wave of air cleans the interior of rotary separator C by blowing off powdered material residue attached to the ceiling member. Thus, a powdered material being processed leaves no residue to contaminate successive powdered materials.

Figure 5:
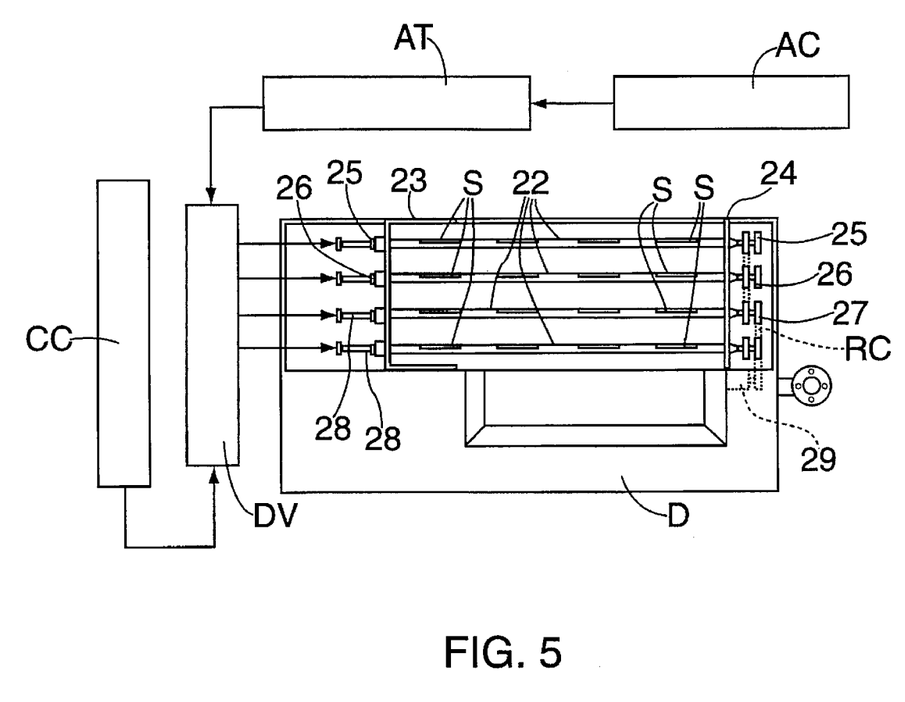
FIG. 5 is a top plan view of filter cleaning device and a filter according to another embodiment of the present invention.

Referring to FIG. 5, a further embodiment of the present invention automatically cleans an interior of a powdered material processing device, such as an upper filter. In FIG. 5, a top plate of an upper filter D is removed to show parts of the present embodiment. Four hollow cleaning nozzle pipes 22 attach to two frames 23 and 24 near a ceiling member (not shown) of the interior of a powder filtering room of upper filter D. Cleaning nozzle pipes 22 are preferably constructed of a noncorrosive material with high tensile strength, such as copper or PVC. A closed end of each cleaning nozzle pipe 22 includes an oil seal 25 which allows each cleaning nozzle pipe 22 to oscillate inside frame 24. A plurality of equally spaced slits S for releasing air is formed lengthwise on each cleaning nozzle pipe 22.

A double sprocket 27 fits onto a rhombic flanged unit 26 on the closed end of each cleaning nozzle pipe 22. A pair of roller chains RC rotationally couple double sprockets 27 on each cleaning nozzle pipe 22 to a geared motor 29. Drive belts can be used to rotationally couple cleaning nozzle pipes 22 to geared motor 29; however, a roller chain is more durable than a drive belt.

During cleaning, geared motor 29 oscillates, causing all four cleaning nozzle pipes 22 to oscillate such that slits S sweep through a predetermined angle along the ceiling member of upper filter D. The predetermined angle of oscillation is set such that the ceiling member is fully cleaned without interfering with a filtering process.

A rotary single action coupling 28 forms a socket which attaches to an open end of each cleaning nozzle pipe 28.

Rotary single action coupling 28 connects the open end of each cleaning nozzle pipe 28 to a diaphragm electromagnetic valve DV. Diaphragm electromagnetic valve DV regulates air flow from a high pressure air accumulator tank AT to cleaning nozzle pipes 28. An air compressor AC supplies pressurized air to accumulator tank AT. A sequence controller CC sends signals to open and close diaphragm electronic valve DV.

When powdered material residue accumulates on the ceiling member of a powder filtering room, geared motor 29 oscillates, causing cleaning nozzle pipes 22 to oscillate. Compressor AC pressurizes high pressure accumulator tank A to a sufficient pressure to dislodge residue from a powdered material being processed. Sequence controller CC sends a control signal CC to open and close diaphragm electromagnetic valve DV. While cleaning nozzle pipes 22 oscillate through a wide angle, a high pressure air pulse is expelled from slits S, which face the ceiling member. The resulting shock wave of air cleans the ceiling member of filter D by blowing off powdered material residues. Thus filtering a powdered material leaves no residue to contaminate successive materials in filter D.

Each of the above embodiments of the present invention devices cleans ceilings and inside walls of a powdered material processing device automatically without stopping the operation of a processing device. Automatic cleaning eliminates the need for manual labor, creating safer working conditions. These advantages vastly increase the efficiency of powdered material processing devices which are often criticized for having high operating costs. The present embodiments provide a benefit for both the industry and the workers.

Figure 6:
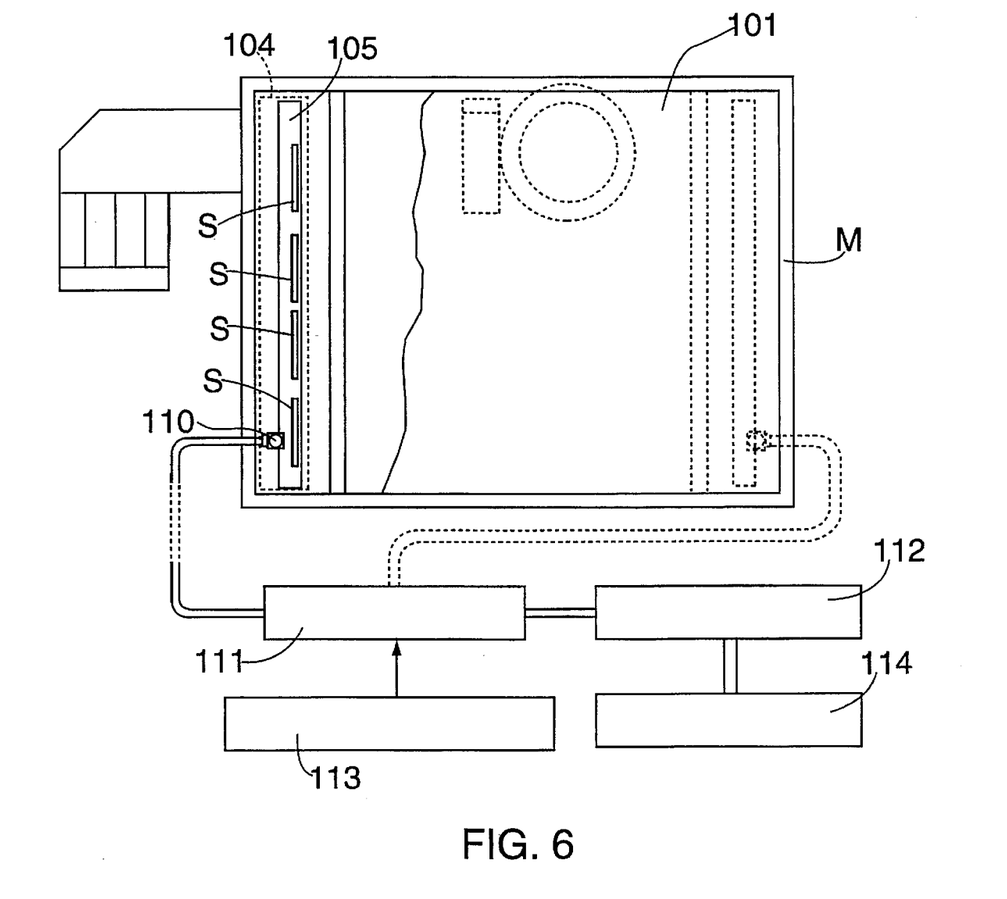
FIG. 6 is a partially sectioned top view of a mixer cleaning device and a mixer according to another embodiment of the present invention.
Figure 7:
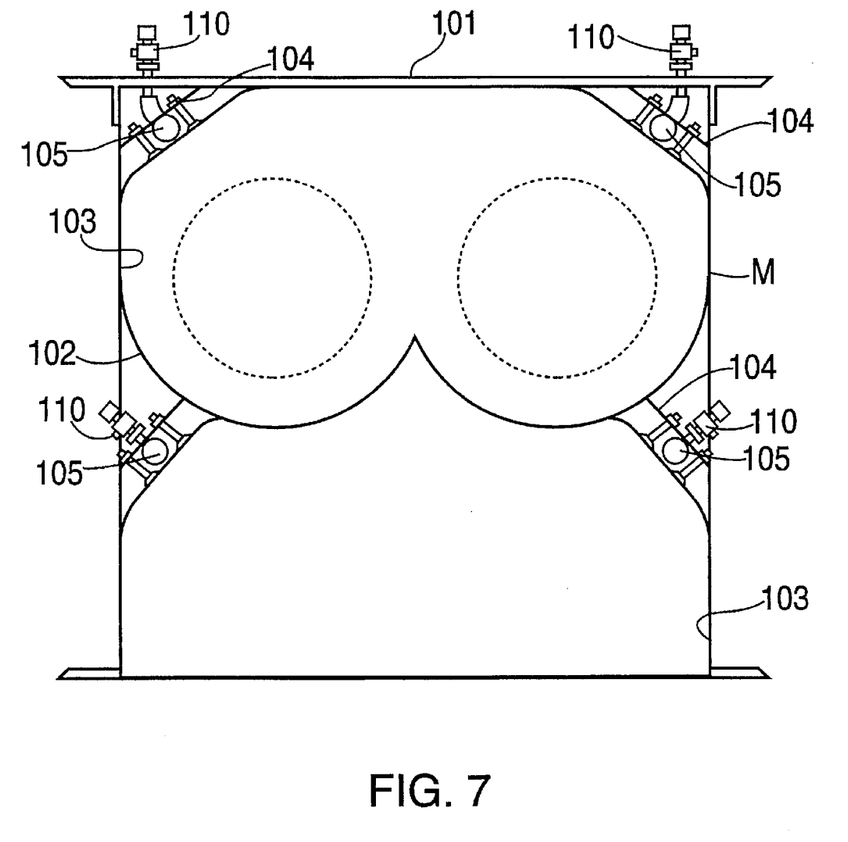
FIG. 7 is a front view of the embodiment of FIG. 6.
Figure 8:
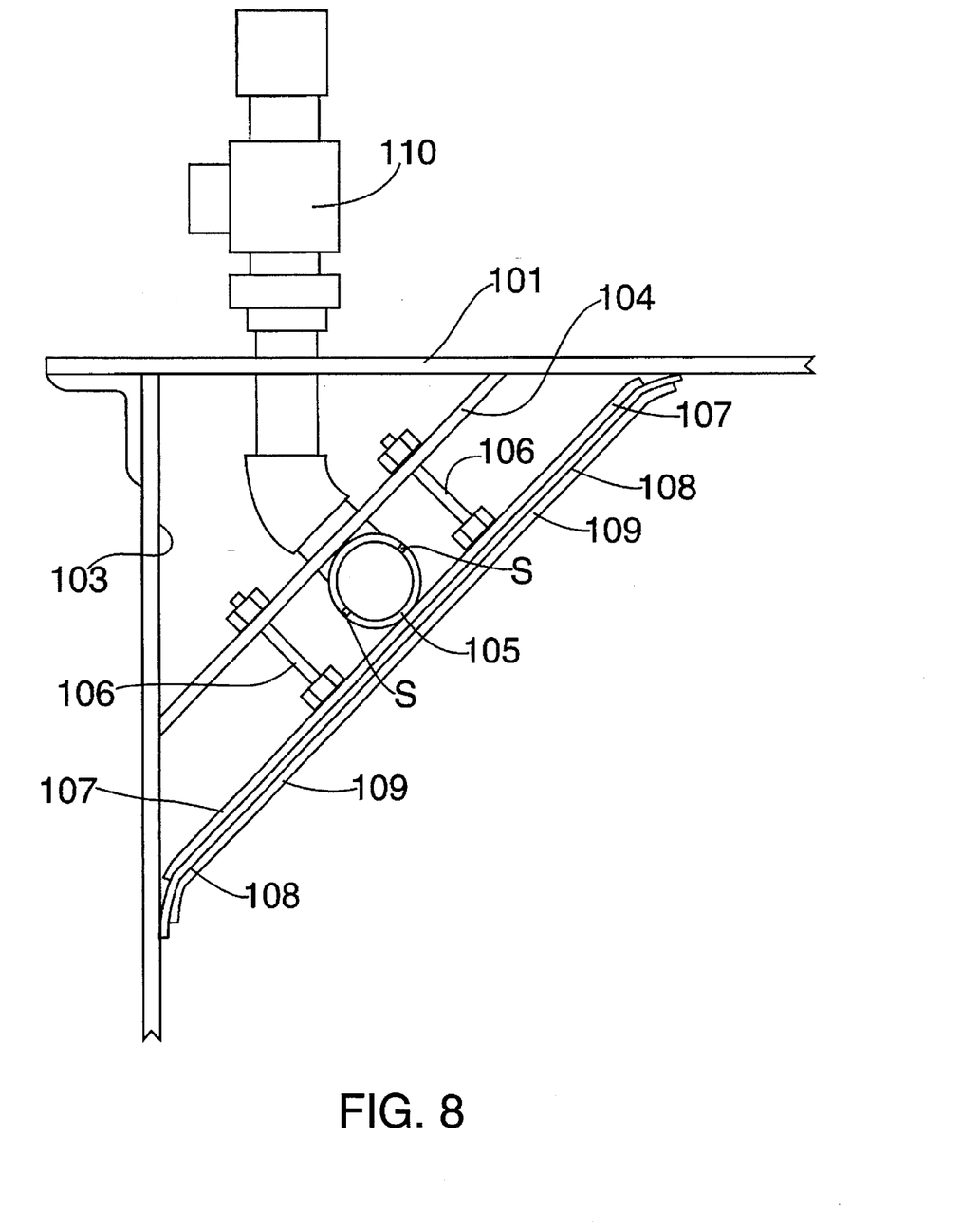
FIG. 8 is an enlarged side view of the embodiment of FIG. 6.

Referring to FIGS. 6–8, a further embodiment of the present invention is adaptable to clean interior powdered material processing devices with different inner configurations, such as a mixer with a different interior shape than that shown in the embodiment of FIG. 3a and 3b. The present embodiment is particularly adaptable to clean powdered material processing devices which include interior corners. For example, a mixer M (shown in FIGS. 6–8) has a rectangular shape. A partition member 102 divides mixer M into upper and lower interior regions. Two air spray pipes 105, located in opposing upper corners of mixer M clean the upper region of mixer M. Two air spray pipes 105 located below partition member 102 clean the lower region of mixer M. Each air spray pipe 105 tangentially attaches to one of four support plates 104. Two support plates 104 in the upper region attach to a ceiling member 101 and a side wall 103. Two support plates 104 in the lower region attach to side wall 103 and partition member 102. Two fastening bolts 106 connect each support plate 104 to a stiffening member 107. A flexible member 108, made preferably of a polyester material, attaches to each stiffening member 107, sealing each air spray pipe 105 in an interior corner of mixer M. A keeper plate 109 attached to an inner surface of each flexible member 108 prevents each flexible member 108 from being damaged or blown off during cleaning.

A plurality of equally-spaced slits S, preferably 0.3–0.5 mm wide, is formed on diametrically opposed outer surfaces of each air spray pipe 105. Slits S on air spray pipes 105 in the upper region of mixer M face ceiling member 101 and side wall 103. Slits S on air spray pipes 105 in the lower region of mixer M face partition member 102 and side wall 103.

To clean interior surfaces of mixer M, the mixing process stops. A compressor 113 pressurizes an accumulator tank 112 to a sufficient pressure to dislodge residues of a particular powdered material being processed. A sequence controller 113 sends a signal to a diaphragm electromagnetic valve 111. Diaphragm electromagnetic valve 111 opens and closes, sending pulses of pressurized air into each of four air supply pipes 110. Air supply pipes 110 communicate the pulses of pressurized air to each air spray pipe 105. Each pulse is expelled from slits S into sealed corner areas of mixer M. The expelled air flows at high speed, increasing the pressure in each sealed corner area. When pressure in each corner area reaches a sufficient amount, flexible members 108 flex inward, releasing shock waves of highly pressurized air along ceiling member 101, side walls 103, and partition member 102. The shock waves dislodge powdered material residue on interior surfaces of mixer M, preventing contamination of subsequently processed materials.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the above mechanism can be similarly applied to other powder processing devices such as dryers, screw conveyors, scales, and bag openers, obtaining the same results.

What is claimed is:

1. An automatic interior cleaning system for a powdered material processing device comprising:

a hollow pipe having closed ends;

a plurality of slits through said pipe, said slits facing at least one interior surface to be cleaned;

means for rotating said hollow pipe within said device such that said slits move over an entire portion of said at least one interior surface to be cleaned; and means for feeding pulses of a gas to an interior of said pipe, whereby said pulses clean an interior of said device.

2. An apparatus according to claim 1, wherein said means for feeding comprises:

means for storing said gas;

a compressor for maintaining a pressure of said gas in said means for storing, said pressure sufficient to clean said device;

a valve between said means for storing and said pipe;

said valve being responsive to a control signal; and means for opening and closing said valve, thereby feeding said pulses of said gas to said pipe.

3. An apparatus according to claim 1, wherein said valve is a diaphragm electromagnetic valve.

4. An apparatus according to claim 1, wherein said gas is air.

5. An automatic interior cleaning system for a silo comprising:

a hollow pipe having closed ends;

said pipe having a U-shape;

a plurality of slits through said pipe;

a first group of said slits facing a ceiling member of said silo;

a second group of said slits facing a side wall of said silo;

means for rotating said pipe; and means for feeding pulses of a gas to an interior of said pipe, whereby said pulses clean an interior of said silo.

6. An apparatus according to claim 5, wherein said means for rotating comprises:

a drive mechanism located above said ceiling member;

a hollow rotating shaft including first and second open ends;

said first open end being connected to said drive mechanism;

said second open end being connected to said pipe;

means for coupling said rotating shaft to said means for feeding; and said drive mechanism rotating said pipe during cleaning.

7. An automatic interior cleaning system for a powdered material processing device comprising:

at least one hollow member having closed ends;

means for feeding pulses of a gas to an interior of said member;

a plurality of slits for transmitting said pulses from said interior of said member to an interior of said device, whereby said pulses clean said interior of said device; and a drive assembly rotatably connected to said at least one hollow member such that said at least one hollow member rotates when said drive assembly is rotated.

8. An apparatus according to claim 7, wherein said means for feeding includes:

a compressor;

means for storing said gas;

a valve connected between said means for storing and said hollow member;

said compressor maintaining a sufficient pressure of said gas in said means for storing to clean said device;

said valve being responsive to a control signal; and said valve opening and closing, thereby feeding said pulses to said hollow member.

9. An interior surface cleaning device for removing powdered material from an interior surface of a vessel, comprising:

a hollow body having a closed end;

said hollow body having a plurality of slits;

a compressor connected to said hollow body supplying pulses of a gas to said hollow body;

said hollow body rotatably connected within said vessel such that said slits are movable over an entire area of said surface to be cleaned.

10. The interior surface cleaning device of claim 9 further including a drive assembly rotatably connected to said hollow body such that said hollow body rotates when said drive assembly is rotated.

* * * * *